April 21, 1953 R. A. JOHNSON 2,635,893
FOLDING GOLF CART
Filed Aug. 6, 1951 3 Sheets-Sheet 1
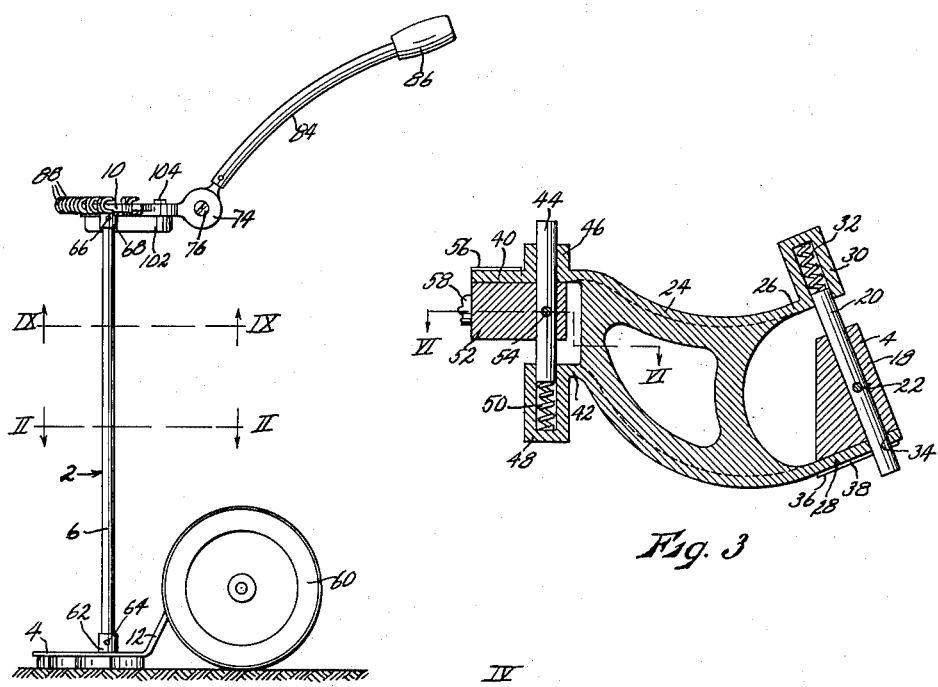
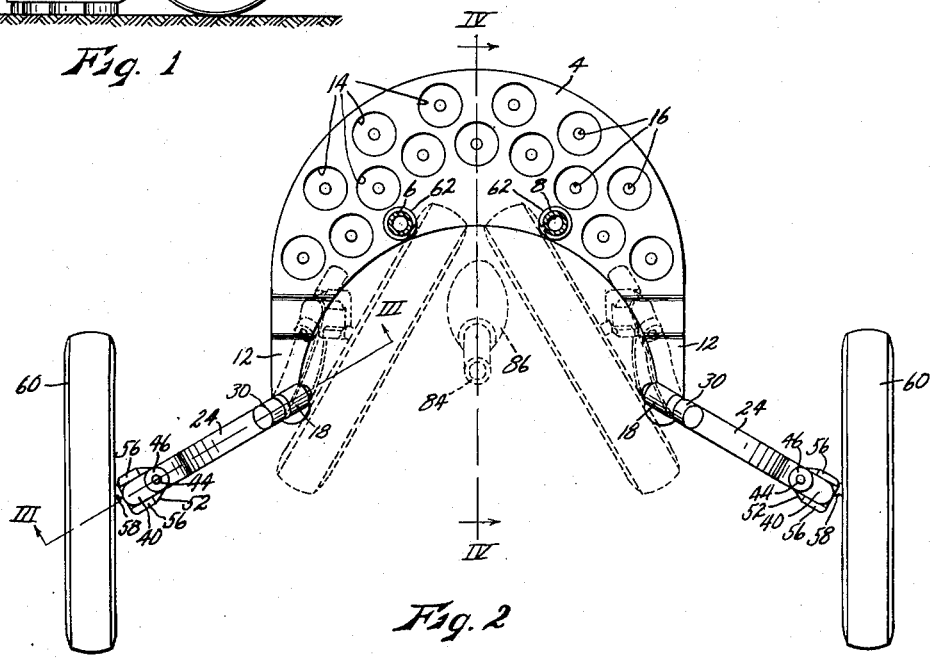
INVENTOR.
Robert A. Johnson
BY Hamilton & Hamilton
Attorneys.

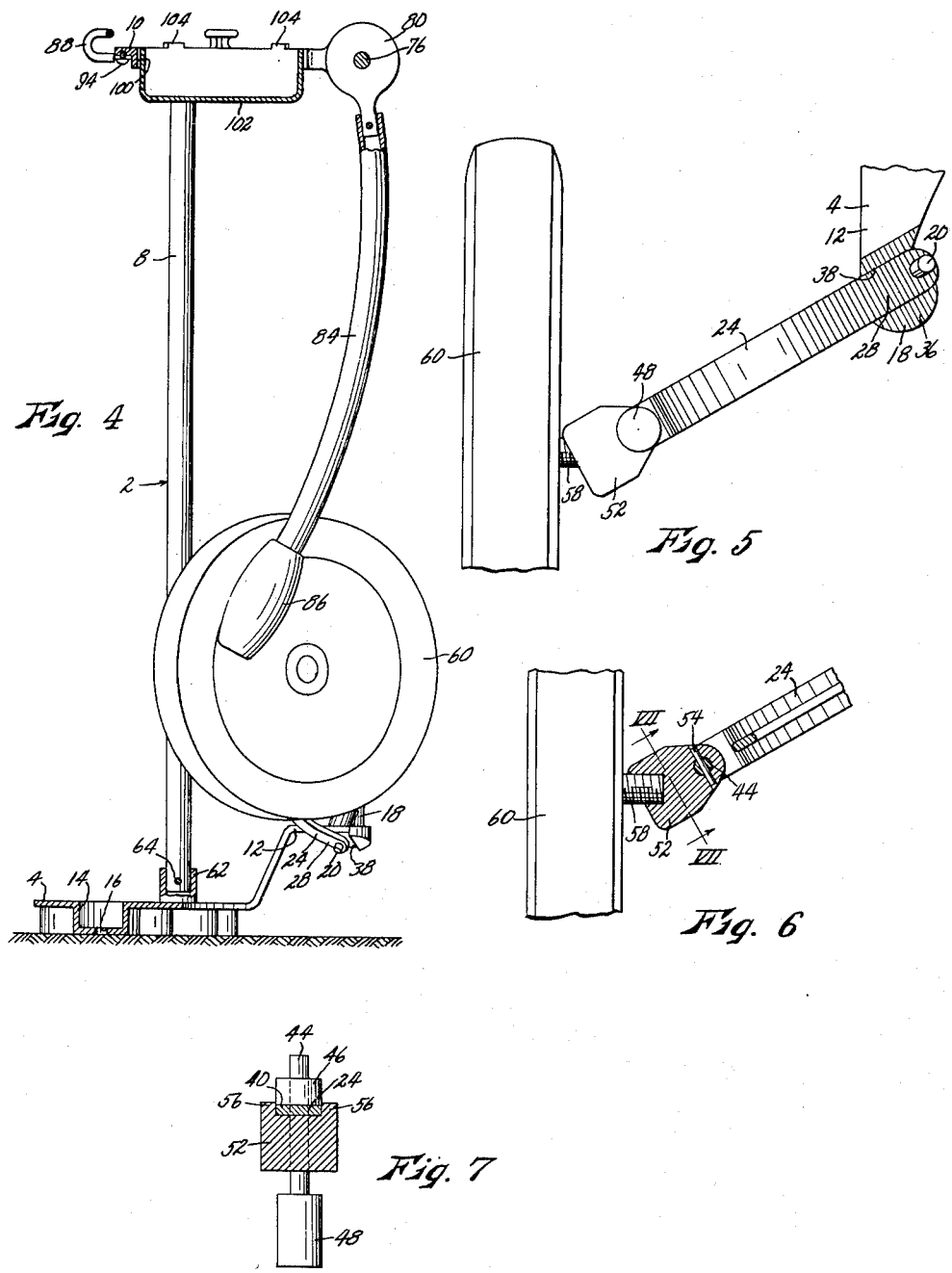

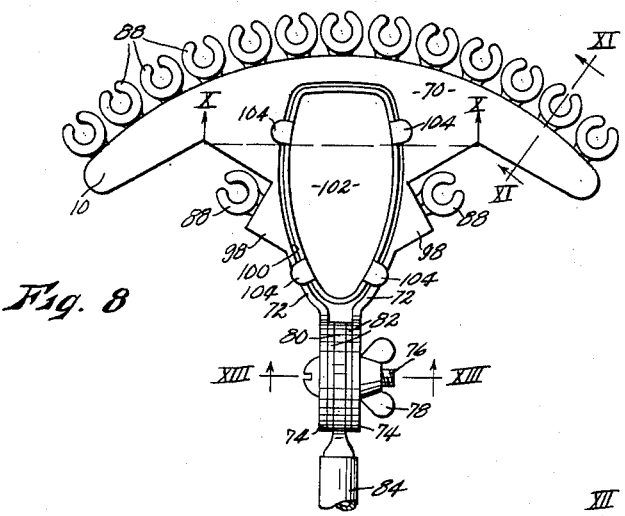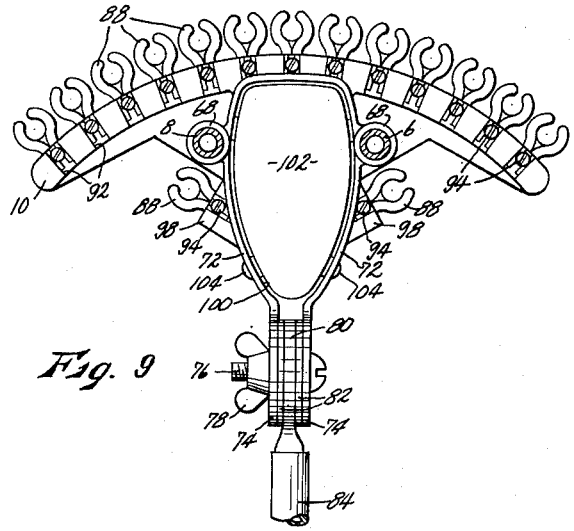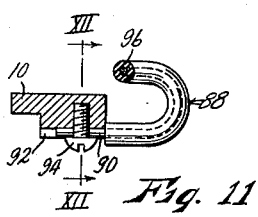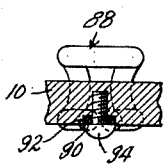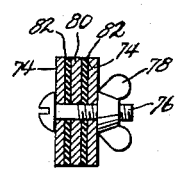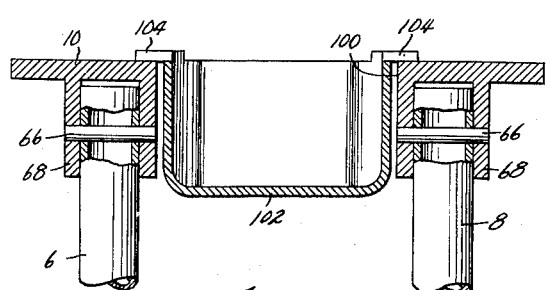

Patented Apr. 21, 1953

2,635,893

UNITED STATES PATENT OFFICE 2,635,893

FOLDING GOLF CART

Robert A. Johnson, Kansas City, Mo.

Application August 6, 1951, Serial No. 240,496

4 Claims. (Cl. 280—42)

This invention relates to new and useful improvements in golf carts, and has particular reference to golf carts of the collapsible or folding type.

The principal object of the present invention is the provision of a golf cart which is collapsible into compact form for convenient storage and transportation.

Another object is the provision of a golf cart having a frame adapted to carry golf clubs, and grounding engaging wheels carried at the outer ends of arms which are attached to and extend outwardly from said frame, said wheels being pivoted to said arms and said arms being pivoted to said frame, whereby said wheels may be retracted inwardly.

A further object is the provision of a golf cart having the above described wheel arrangement wherein the pivoted connections are provided with automatic locking means which engage and hold the arms and wheels in their operative positions, and wherein said locking means is normally held in engagement by gravity.

A still further object is the provision of a golf cart having the above described wheel arrangement, and including an outwardly extending handle whereby the cart may be propelled manually, said handle being pivotally movable to a retracted position, and being adapted when retracted to engage and lock said wheels in their retracted positions.

A still further object is the provision of a "bagless" golf cart; that is, a cart adapted to hold golf clubs, balls, tees, and the like, without the use of the usual golf bag.

Other objects are simplicity and economy of construction, ease and convenience of operation, and adaptability to a wide variety of uses.

With these objects in view, as well as other objects which will appear in the course of the specification, reference will be had to the drawings, wherein:

Fig. 1 is a side elevational view of a golf cart embodying the present invention.

Fig. 2 is an enlarged sectional view taken on line II—II of Fig. 1, showing the wheels in their extended or operative position in solid lines, and in their folded position in dotted lines.

Fig. 3 is an enlarged sectional view taken on line III—III of Fig. 2, with parts broken away.

Fig. 4 is a sectional view taken on line IV—IV of Fig. 2 with the cart in its folded position, with parts broken away.

Fig. 5 is a fragmentary enlarged inverted plan view of the cart, showing one of the wheels and its associated parts.

Fig. 6 is a fragmentary sectional view taken on line IV—IV of Fig. 3.

Fig. 7 is a sectional view taken on line VII—VII of Fig. 6.

Fig. 8 is an enlarged fragmentary plan view of the cart.

Fig. 9 is an enlarged fragmentary sectional view taken on line IX—IX of Fig. 1, and is substantially an inverted plan view of the parts shown in Fig. 8.

Fig. 10 is an enlarged fragmentary section taken on line X—X of Fig. 8, with parts broken away.

Fig. 11 is an enlarged section taken on line XI—XI of Fig. 8.

Fig. 12 is a fragmentary section taken on line XII—XII of Fig. 11.

Fig. 13 is a sectional view taken on line XIII—XIII of Fig. 8.

Like reference numerals apply to similar parts throughout the several views, and the numeral 2 applies to a frame comprising a base 4, standards 6 and 8 secured at their lower ends to said base and extending upwardly therefrom, and a head 10 secured to the upper ends of said standards. Base 4 is substantially crescent shaped and planar, curving arcuately forwardly and being provided at each side with a rearwardly extending ear 12, said ears being offset upwardly from the main portion of the base as shown in Figs. 1 and 4. The base is formed to present a plurality of upwardly openings sockets 14 as best shown in Figs. 2 and 4, each socket being adapted to receive the end of the handle portion of a golf club as hereinafter described. The bottom wall of each socket has a hole 16 formed therethrough to prevent rain water or the like from collecting therein.

The rearward end portion of each base ear 12 is provided with an integral lug 18 through which extends a bearing pin 20. Said bearing pin, which is inclined upwardly and rearwardly, extends above and below lug 18, and is fixed therein by means of pin 22. Bearing pin 20 carries an arm 24. Said arm is bifurcated at its inner end to present an upper leg 26 and a lower leg 28, as best shown in Fig. 3, spaced apart a distance greater than the axial length of lug 18. Upper leg 26 is provided with an integral socket member 30 which fits pivotally over the upper end portion of pin 20. A spring 32 carried in said socket member bears at one end against the upper end of pin 20 and at its opposite end against the end wall of the socket, whereby arm 24 is urged upwardly with respect to pin 20. Lower leg 28 is provided with a hole 34 which fits pivotally on the lower end portion of pin 20. The lower surface 36 of lug 18 is disposed at right angles to pin 20; whereby to provide a bearing surface for leg 28 as arm 24 turns, and has a groove 38 formed therein into which leg 28 is urged by spring 32, thereby normally locking arm 24 against rotation in the rearwardly inclined position shown in Fig. 2.

The outer end of each arm 24 is also bifurcated to present an upper leg 40 and a lower leg 42, said legs being vertically spaced apart. A vertical pivot pin 44 extends between and is carried for rotary oscillation and axial sliding movement by legs 40 and 42, the upper end portion of said pin being disposed in a bearing 46 formed integrally with leg 40, and the lower end portion of said pin being carried in a socket member 48 formed integrally with leg 42. A spring 50 disposed in said socket member bears at one end against the lower end of pin 44 and at its opposite end against the bottom wall of the socket, whereby pin 44 is urged upwardly. A block 52 is mounted on pin 44 intermediate legs 40 and 42, being rigidly fixed thereon by means of pin 54. The upper surface of said block is provided with a pair of integral spaced apart lugs 56 which normally project upwardly on either side of leg 40 as best shown in Fig. 7, thereby securing said block against pivotal movement relative to arm 24. Threaded into block 52, and projecting outwardly therefrom in a direction at right angles to the direction of travel of the cart, is a stub axle 58, on which is rotatably mounted a ground engaging wheel 60.

Base 4 is provided with a pair of transversely spaced apart integral socket members 62, in which the lower ends of standards 6 and 8 are respectively fixed by means of pins 64. The upper ends of said standards are secured by pin 66 in socket members 68 formed integrally on the lower surface of head 10. Head 10 is substantially planar, having a substantially crescent shaped forward portion 70 and two spaced apart, rearwardly extending arms 72, and is formed of metal or other suitable material such that said arms possess a degree of resilience in a horizontal plane. The rearward end of each arm 72 is formed to present a circular pressure plate 74 disposed in a vertical plane. Said pressure plates are coaxial, and a bolt 76 provided with a wing nut 78 extends centrally therethrough as best shown in Figs. 8, 9, and 13. A disc 80 is disposed on bolt 76 between plates 74, and a friction washer 82 is disposed between each plate 74 and disc 80. A handle 84 is secured at one end to disc 80, and extends normally upwardly and rearwardly therefrom, being provided at its outer end with a hand grip 86. Said handle provides a means whereby the cart may be manually propelled, and also as a means for locking the wheels 60 in their folded position, as will be described later.

Head 10 is provided around its arcuate forward edge with a plurality of spring clips 88. As detailed in Figs. 11 and 12, each clip comprises a length of resilient wire 90 having its end portion disposed in a groove 92 formed in the lower surface of head 10 and secured therein by the head of a screw 94 threaded upwardly into said head. Said wire extends outwardly from the head in a loop, said loop being covered with a tubular sheath 96 of soft rubber or the like. The outer end portion of the loop is rebent upwardly and inwardly and formed to present a substantially circular clip open at the front, as indicated in Figs. 8 and 9. Each arm 72 of head 10 is provided with an outwardly projecting lug 98, to which an additional clip 88 is similarly secured.

An opening 100 is formed centrally in head 10, the rearward portion of said opening being defined by arms 72. Within said opening is disposed a cup 102 suitable for carrying golf balls, tees, and the like. Said cup is provided around its upper edge with a plurality of outwardly extending ears 104 which engage head 10 adjacent opening 100 to support the cup. Said cup must fit somewhat loosely in said opening, in order not to interfere with the flexing of arms 72.

The operation of the cart is substantially as follows: With the cart in its operative position as shown in Fig. 1 and in solid lines Fig. 2, the cart may be propelled by means of handle 84 by simply tilting the cart slightly rearwardly to elevate base 4 above the ground. When at rest, base 4 engages the ground to support the cart against tilting. Handle 84 may be adjusted to the convenience of any user by loosening bolt 76. The wheels are secured in their operative position by the engagement of leg 28 in groove 38 and the engagement of leg 40 between lugs 56 of wheel block 52, as previously described. It will be seen from a consideration of Fig. 2 that both of said pivot locks are maintained in their operative position by gravity, the weight of frame 2 acting to urge grooved lug 18 downwardly over leg 28 of arm 24, and to urge leg 40 of arm 24 downwardly between lugs 56 of block 52. Hence springs 32 and 50 serve principally to prevent accidental disengagement of any of the pivot locks in case either wheel 60 should be elevated above the ground. Golf clubs are inserted merely by placing the end of the handle in one of the sockets 14 of base 4, and pressing the shank of the club into the associated spring clip 88.

When it is desired to fold the cart, the operator first rocks the cart forwardly on base 4 to elevate the wheels above the ground, and pushes downwardly on one of wheels 60. This pushes the associated block 52 and pivot pin 44 downwardly with respect to arm 24, against the pressure of spring 50, until lugs 56 of the block are freed from leg 40 of arm 24. The wheel may then be pivoted forwardly and inwardly to lie against arm 24. At the same time, arm 24 is moved downwardly on pivot pin 20 until leg 28 of said arm is freed from groove 38 of lug 18, whereupon arm 24 may be pivoted inwardly and forwardly until wheel 60 strikes the associated standard 6 or 8, as indicated in dotted lines on Fig. 2. This operation is repeated with the other wheel. The spacing and angularity of pivot pins 20 and 44 is such that wheels 60 may be moved to the dotted position in Fig. 2 without interference therebetween. As stated, standards 6 and 8 serve as stops limiting the folding movement of the wheels. Said wheels are secured in their folded position by loosening bolt 76 and pivoting handle 84 downwardly till the free end thereof lies directly between the wheels, as shown in Fig. 4 and in dotted lines in Fig. 2, then retightening bolt 76 to secure the handle in position. Said handle then lies in the path of both wheels, and effectively prevents them from pivoting to their extended positions.

Thus it is apparent that a golf bag having several advantages has been produced. It is extremely simple in construction and easy to manipulate. It does not require the use of the usual golf bag to hold clubs, balls, tees, and the like. When folded, it occupies no more space than many golf bags and can easily be stored or transported in an automobile, yet when unfolded it provides wheels of sufficient diameter and sufficiently widely spaced apart to provide good stability even on rough terrain. The angularity of pivot pins 20 provides that the horizontal extension of the wheels therefrom will be substantially reduced as arms 24 are pivoted inwardly, thereby permitting smaller dimensions of the folded cart. It also provides that wheels 60 are substantially elevated above the base as arms 24 are pivoted inwardly, thereby permitting the cart to rest solidly on said base. Folding or unfolding the cart in no way interferes with the golf clubs carried by the cart.

While I have shown and described a specific embodiment of my invention, it is apparent that many minor changes of structure and operation could be made without departing from the spirit and scope of the invention as defined in the appended claims.

What I claim as new and desire to protect by Letters Patent is:

1. A golf cart comprising a frame including a base, a pair of upwardly and outwardly sloping pivot pins carried fixedly by said base respectively at opposite sides thereof, an arm carried at its inner end for pivotal and axial sliding movement on each of said pins and normally extending outwardly from said base, said base having a downwardly opening groove formed therein adjacent each of said pins, said groove normally receiving the associated arm therein to secure it in its extended position, a block carried for pivotal and axial sliding movement at the outer end of each of said arms on a normally vertical axis, said block having an upwardly opening groove formed therein, said groove normally receiving said arm therein to secure said block against pivotal movement, a ground engaging wheel carried rotatably by each of said blocks on a horizontal axis, whereby the weight of said frame normally holds said arms in both of said grooves, and whereby when said arm is moved axially downwardly relative to the related pivot pin and said block is moved downwardly relative to said arm, said arm is released from said grooves, whereupon said wheels may be pivoted to be against said arms and said arms may be folded to extend inwardly relative to said base, and means for securing said wheels and arms in said folded position.

2. A golf cart comprising a frame including a base, a pair of upwardly and outwardly sloping pivot pins carried fixedly by said base respectively at opposite sides thereof, an arm carried at its inner end for pivotal and axial sliding movement on each of said pins and normally extending outwardly from said base, said base having a downwardly opening groove formed therein adjacent each of said pins, said groove normally receiving the associated arm therein to secure it in its extended position, resilient means urging said arms upwardly relative to said base, a block carried for pivotal and axial sliding movement at the outer end of each of said arms on a normally vertical axis, said block having an upwardly opening groove formed therein, said groove normally receiving said arm to secure said block against pivotal movement and resilient means urging said block upwardly relative to said arm and a ground engaging wheel carried rotatably by each of said blocks on a normally horizontal axis.

3. A golf cart comprising a frame including a base, a pair of arms each pivotally carried by said base and normally extending transversely outwardly from the sides of said base, releasable means securing each of said arms in said extended position, a wheel carried at the outer end of each of said arms for rotation on a horizontal axis transverse to the line of travel of the cart and for pivotal movement on a vertical axis, releasable means normally securing said wheels against movement on their pivotal axes, whereby when said two sets of securing means are released said wheels may be pivoted to be against their respective arms and said arms may be pivoted to extend inwardly from the side of said base, said wheels then moving through intersecting paths, stops carried by said base for limiting the inward pivotal movement of said arms and wheels, a head disposed above and rigidly carried by said base, and an elongated handle secured at one end to said head for pivotal movement in a vertical plane and normally extending upwardly and rearwardly therefrom, the free end portion of said handle being adapted to rest in the common path of said wheels when said handle is pivoted downwardly, thereby securing said wheels and arms against outward pivotal movement, and means for releasably securing said handle in any of its pivotal positions.

4. A golf cart comprising a frame including a base, a pair of upwardly and outwardly sloping pivot pins carried fixedly by said base respectively at opposite sides thereof, an arm carried at its inner end for pivotal and axial sliding movement on each of said pins and normally extending outwardly from said base, said base having a downwardly opening groove formed therein adjacent each of said pins, said groove normally receiving the associated arm therein to secure it in its extended position, a block carried for pivotal and axial sliding movement at the outer end of each of said arms on a normally vertical axis, said block having an upwardly opening groove formed therein, said groove normally receiving said arm therein to secure said block against pivotal movement, a ground engaging wheel carried rotatably by each of said blocks on a horizontal axis, whereby the weight of said frame normally holds said arms in both of said grooves, and whereby when said arm is moved axially downwardly relative to the related pivot pin and said block is moved downwardly relative to said arm, said arm is released from said grooves, whereupon said wheels may be pivoted to lie against said arms and said arms may be pivoted to extend inwardly from the sides of said base, said wheels then moving through intersecting paths, stops carried by said base for limiting the inward pivotal movement of said wheels, an elongated handle secured at one end to said frame at a point above said wheels for pivotal movement in a vertical plane and normally extending upwardly and rearwardly, said handle being pivotal downwardly whereby the free end portion thereof may be disposed in the common path of said wheels to secure them against outward pivoted movement, and releasable means for securing said handle in any of its pivotal positions.

ROBERT A. JOHNSON.

References Cited in the file of this patent

UNITED STATES PATENTS

| Number | Name | Date |
|---|---|---|
| 2,411,965 | Hartung | Dec. 3, 1946 |
| 2,523,893 | Williamson | Sept. 26, 1950 |
| 2,577,290 | Underwood | Dec. 4, 1951 |